(12) United States Patent
Nakata (10) Patent No.: US 11,584,431 B2
(45) Date of Patent: Feb. 21, 2023

(54) VEHICLE STEERING SYSTEM

(71) Applicant: Toyota Jidosha Kabushiki Kaisha, Toyota (JP)

(72) Inventor: Daisuke Nakata, Seto (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 150 days.

(21) Appl. No.: 17/228,011

(22) Filed: Apr. 12, 2021

(65) Prior Publication Data

US 2021/0339798 A1    Nov. 4, 2021

(30) Foreign Application Priority Data

Apr. 30, 2020    (JP) .............................. JP2020-080687

(51) Int. Cl.
*G01N 19/02*       (2006.01)
*B62D 6/00*        (2006.01)
*B60Q 9/00*        (2006.01)

(52) U.S. Cl.
CPC ................ *B62D 6/00* (2013.01); *B60Q 9/00* (2013.01); *G01N 19/02* (2013.01)

(58) Field of Classification Search
CPC ............. B62D 6/00; B60Q 9/00; G01N 19/02
See application file for complete search history.

(56) References Cited

FOREIGN PATENT DOCUMENTS

JP          2019064568 A       4/2019

*Primary Examiner* — Mathew Franklin Gordon
(74) *Attorney, Agent, or Firm* — Sughrue Mion, PLLC (57) ABSTRACT

A steering system for a vehicle, including: a pair of wheel steering devices that respectively steer right and left wheels independently of each other; and a controller configured to control the pair of wheel steering devices, wherein the controller is configured to: determine a standard steering amount of each of the right and left wheels in accordance with a steering request; execute opposite-phase shift steering in which steering amounts of the respective right and left wheels are shifted in mutually opposite directions by respective shift amounts with respect to the standard steering amounts determined respectively for the right and left wheels; and estimate a friction coefficient of a road surface on which the vehicle is running based on steering forces respectively applied to the right and left wheels in the opposite-phase shift steering.

11 Claims, 9 Drawing Sheets

VEHICLE STEERING SYSTEM

CROSS REFERENCE TO RELATED APPLICATION

The present application claims priority to Japanese Patent Application No. 2020-080687, which was filed on Apr. 30, 2020, the disclosure of which is herein incorporated by reference in its entirety.

BACKGROUND

Technical Field

The following disclosure relates to a steering system for a vehicle for steering right and left wheels independently of each other.

Description of Related Art

In the field of a vehicle steering system (hereinafter simply referred to as "steering system" where appropriate), a technique of estimating, based on an axial force, a degree of understeer in turning of a vehicle has been known as described in Patent Document 1 (Japanese Patent Application Publication No. 2019-64568). The axial force is a force for steering wheels of the vehicle and corresponds to a steering force.

SUMMARY

The degree of understeer in turning of the vehicle depends on a friction coefficient of a road surface on which the vehicle runs (hereinafter referred to as "road surface $\mu$" where appropriate). In terms of turning stability of the vehicle, estimation of the road surface $\mu$ is advantageous. In the meantime, a steering system for steering right and left wheels independently of each other (hereinafter referred to as "right-left independent steering system" where appropriate) has been developed. It is advantageous to estimate the road surface $\mu$ also in the right-left independent steering system. It is possible to enhance the utility of the right-left independent steering system by employing a technique of estimating the road surface $\mu$ unique to the right-left independent steering system. Accordingly, an aspect of the present disclosure is directed to a right-left independent steering system having high utility.

In one aspect of the present disclosure, a steering system for a vehicle includes: a pair of wheel steering devices that respectively steer right and left wheels independently of each other; and a controller configured to control the pair of wheel steering devices, wherein the controller is configured to:
determine a standard steering amount of each of the right and left wheels in accordance with a steering request;
execute opposite phase shift steering in which steering amounts of the respective right and left wheels are shifted in mutually opposite directions by respective shift amounts with respect to the standard steering amounts determined respectively for the right and left wheels; and
estimate a friction coefficient of a road surface on which the vehicle is running based on steering forces respectively applied to the right and left wheels in the opposite-phase shift steering.

In general, in a case where the road surface $\mu$ is small, the steering force for steering the wheel is small. It is thus possible to easily estimate the road surface $\mu$ based on the steering force. The right-left independent steering system enables the right and left wheels to be steered in mutually opposite directions, namely, enables the right and left wheels to be steered in an opposite phase. The present steering system executes the opposite-phase shift steering described above. Though the wheel steering devices receive some load by execution of the opposite-phase shift steering, the opposite-phase shift steering enables the right and left wheels to be steered to some extent in a state in which a slip angle of a vehicle body made by steering of the wheels does not largely deviate from that corresponding to the steering request. (The slip angle of the vehicle body will be hereinafter referred to as "vehicle-body slip angle" where appropriate.) Thus, the steering system according to the present disclosure enables estimation of the road surface $\mu$ of the road while enabling the vehicle to keep running stably.

VARIOUS FORMS

The estimation of the friction coefficient of the road surface in the present disclosure includes not only estimation of a numerical value of the road surface $\mu$ but also estimation of a degree of the road surface $\mu$. Specifically, the degree of the friction coefficient of the road surface may be estimated based on a degree of the steering force applied to each of the right and left wheels in the opposite-phase shift steering. In this instance, the degree of the road surface $\mu$ may be estimated discretely, namely, in steps. As the estimation of the road surface $\mu$, it may be identified that the vehicle is running on a low friction coefficient road with a relatively small road surface $\mu$. (The low friction coefficient road will be hereinafter referred to as "low-$\mu$ road" where appropriate.). Specifically, when the steering force of at least one of the right and left wheels in the opposite-phase shift steering is smaller than a set steering force, it may be identified that the vehicle is running on the low-$\mu$ road. Further, as the estimation of the road surface $\mu$ it may be identified that the vehicle is running on a split $\mu$ road, namely, the right and left wheels of the vehicle pass over respective road surfaces whose friction coefficients ($\mu$) are relatively largely different from each other.

The steering request may be recognized based on an amount of an operation of a steering wheel (as a steering operation member) made by a driver, for instance. In a case where the vehicle is performing automated driving, the steering request may be recognized based on a command from an automated driving system. It is noted that a situation in which the driver intends to drive the vehicle straight such as a situation in which the driver is not operating the steering operation member may be regarded as one sort of the steering request. The steering amount of each wheel may be regarded as a steering angle of the wheel with respect to a position of the wheel in straight running of the vehicle. The standard steering amounts determined respectively for the right wheel and the left wheel may be mutually the same. The standard steering amounts determined respectively for the right wheel and the left wheel may be mutually different according to the Ackermann geometry. The steering force is a force applied to each wheel by the corresponding wheel steering device for steering the wheel or for maintaining the steering amount of the wheel. In a case where the wheel steering device is configured to steer the wheel in dependence on a force of an electric motor thereof, the steering force may be regarded as a magnitude of a torque of the electric motor and accordingly as an amount of an electric current supplied to the electric motor.

Here, the vehicle-body slip angle at a time when the right and left wheels are steered by the respective standard steering amounts is defined as a standard vehicle-body slip angle. In the steering system according to the present disclosure, the opposite-phase shift steering is preferably executed while the vehicle-body slip angle is maintained at the standard vehicle-body slip angle. For instance, the steering system may execute, in straight running of the vehicle, the opposite-phase shift steering such that the shift amount of the right wheel with respect to the standard steering amount determined therefor may be equal to the shift amount of the left wheel with respect to the standard steering amount determined therefor. Further, the steering system may execute, in turning of the vehicle, the opposite-phase shift steering such that the shift amount of one of the right and left wheels located on an outer side in turning of the vehicle, i.e., a turning outer wheel located more distant from a center of turning of the vehicle, with respect to the standard steering amount determined therefor is smaller than the shift amount of the other of the right and left wheels located on an inner side in turning of the vehicle, i.e., a turning inner wheel located closer to the center of turning of the vehicle, with respect to the standard steering amount determined therefor. The wheel vertical load of the turning outer wheel is larger than that of the turning inner wheel. With this configuration, the vehicle-body slip angle during turning of the vehicle in the opposite-phase shift steering can be made close to or maintained at the standard vehicle-body slip angle.

The opposite-phase shift steering may be executed such that the shift amount of each of the right and left wheels with respect to the standard steering amount periodically varies. This configuration relatively shortens a length of time during which the shift amount of each of the right and left wheels is large, thus reducing a factor that hinders the running stability of the vehicle. In this respect, when the shift amount of each of the right and left wheels is at its peak, the friction coefficient of the road surface on which the vehicle is running may be estimated based on the steering forces respectively applied to the rigid and left wheels. This configuration ensures accurate estimation of the friction coefficient of the road surface.

The steering system according to the present disclosure may execute a notifying process of notifying the driver that the vehicle is running on the low-μ road. Specifically, the driver may be notified by indication on a display of an instrument panel or a waning sound from a speaker. In a case where the vehicle steering system includes the steering operation member operated by the driver and a reaction-force applying device configured to apply an operation reaction force to the steering operation member, the steering system may execute, as the notifying process, a process in which the operation reaction force is made smaller when the vehicle is running on the low friction coefficient road than when the vehicle is not running on the low friction coefficient road. This process enables the driver to effectively feel or aware that the vehicle is running on the low-μ road.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Referring to the drawings, there will be explained below in detail a vehicle steering system according to an embodiment of the present disclosure. It is to be understood that the present disclosure is not limited to the details of the following embodiment but may be embodied based on the forms described in Various Forms and may be changed mid modified based on the knowledge of those skilled in the art.

A. Overall Structure of Vehicle on Which Steering System is Installed

Figure 1:
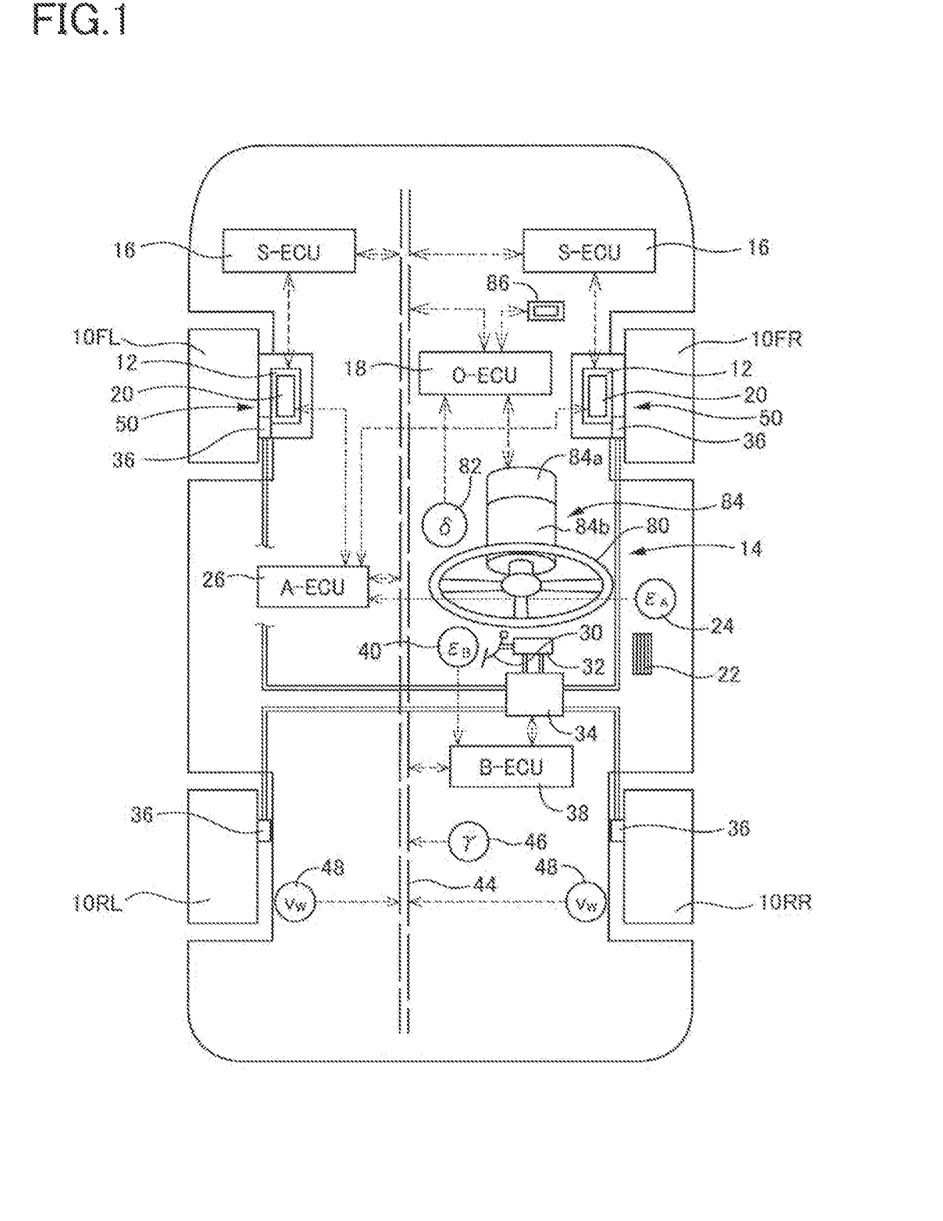
FIG. 1 is a schematic view illustrating an overall structure of a vehicle on which a steering system according to one embodiment is installed.

A steering system according to one embodiment of the present disclosure is installed on a vehicle having front left and right wheels 10FL, 10FR and rear left and right wheels 10RL, 10RR, as schematically illustrated in FIG. 1. The front left and right wheels 10FL, 10FR are drive wheels and steerable wheels. In the following description, when it is not necessary to distinguish the front left and right wheels 10FL, 10FR from each other, each of them will be referred to as the front wheel 10F. When it is not necessary to distinguish the rear left and right wheels 10RL, 10RR from each other, each of them will be referred to as the rear wheel 10R. When it is not necessary to distinguish the front wheel 10F and the rear wheel 10R from each other, each of them will be simply referred to as the wheel 10.

The present steering system is a steer-by-wire steering system and includes: a pair of wheel steering devices 12 provided for the respective front wheels 10F for steering the corresponding two front wheels 10F independently of each other; an operating device 14 for receiving an operation by a driver; a pair of steering electronic control units (hereinafter each abbreviated as "steering ECU" where appropriate)

16 for controlling the corresponding wheel steering devices 12; and an operating electronic control unit (hereinafter abbreviated as "operating ECU" where appropriate) 18 for controlling the operating device 14 and for performing overall control of the two steering ECUs 16. The configuration and the control of the present steering system will be later explained in detail. It may be understood that the two steering ECUs 16 and the operating ECU 18 constitute a controller of the present steering system.

A vehicle drive system is installed on the vehicle. The vehicle drive system includes a pair of wheel drive units 20 each provided for a corresponding one of the two front wheels 10F for drivingly rotating the corresponding front wheel 10F by an electric motor. The vehicle drive system includes: an accelerator pedal 22, as an accelerator operating pedal, operated by the driver; an accelerator operation amount sensor 24 for detecting an operation amount of the accelerator pedal 22; and a vehicle drive electronic control unit (hereinafter abbreviated as "drive ECU" where appropriate) 26 for controlling operations of the pair of wheel drive units 20 based on the accelerator operation amount detected by the accelerator operation amount sensor 24. The vehicle drive system has a known configuration and performs ordinary control, and an explanation thereof is dispensed with.

The vehicle further includes a hydraulic brake system. The brake system includes: a brake pedal 30, as a brake operating member, operated by the driver; a master cylinder 32 connected to the brake pedal 30; a working-fluid supply device 34 including a hydraulic pressure source such as a pump and configured to pressurize a working fluid; four brake devices 36 provided for the respective four wheels for braking the four wheels by a pressure of a working fluid supplied from the working-fluid supply device 34; and a brake electronic control unit (hereinafter abbreviated as "brake ECU" where appropriate) 38 for controlling the operation of the working-fluid supply device 34. The brake system is a brake-by-wire brake system. The brake ECU 38 controls the pressure of the working fluid supplied from the working-fluid supply device 34 to the brake device 36 of each wheel 10 based on a brake operation amount that is an operation amount of the brake pedal 30 detected by the brake operation amount sensor 40, so as to control the braking force applied to the vehicle. The brake system has a known configuration and performs ordinary control, and an explanation thereof is dispensed with.

The vehicle is equipped with a CAN (car area network or controllable area network) 44 to which the two steering ECUs 16, the operating ECU 18, the drive ECU 26, and the brake ECU 38 are connected. Those ECUs 16, 18, 26, 38 perform respective controls while communicating with one another via the CAN 44. In this respect, each of those ECUs 16, 18, 26, 38 includes a computer including a CPU, a ROM, a RAM, etc., and drivers (drive circuits) for driving corresponding constituent elements (such as an electric motor, a valve, and a pump) based on a command of the computer. The vehicle is provided with: a yaw rate sensor 46 for detecting a yaw rate of the vehicle; and wheel speed sensors 48 provided for the respective two rear wheels 10R each for detecting a wheel rotation speed (hereinafter referred to as "wheel speed" where appropriate) of the corresponding rear wheel 10R. The yaw rate sensor 46 and the wheel speed sensors 48 are also connected to the CAN 44.

B. Hardware Configuration of Vehicle Steering System

Figure 2:
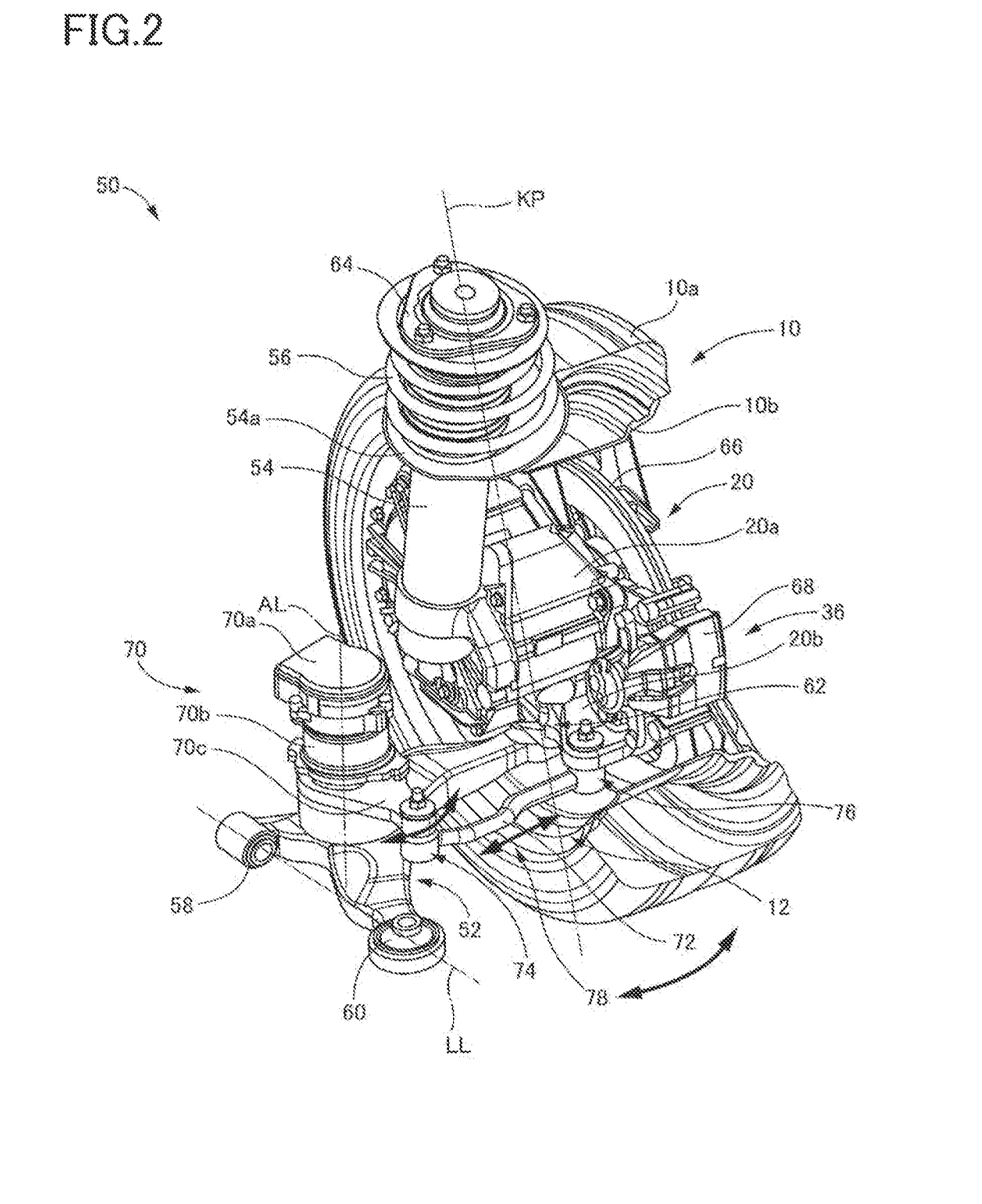
FIG. 2 is a perspective view of a wheel mounting module in which is incorporated a wheel steering device of the steering system according to the embodiment.

The two wheel steering devices 12 of the vehicle steering system according to the present embodiment are incorporated into respective two wheel mounting modules 50. Into each of the two wheel mounting modules 50, a corresponding one of the two wheel drive units 20 of the vehicle drive system and a corresponding one of the four brake devices 36 of the brake system are also incorporated. As illustrated in FIG. 2, the wheel mounting module (hereinafter simply referred to as "module" where appropriate) 50 is for mounting, on a body of the vehicle, a wheel 10b to which a tire 10a is attached. Though the wheel 10b itself may be regarded as the wheel, the wheel 10b to which the tire 10a is attached is referred to as the wheel 10 in the present embodiment for convenience sake.

The configuration of the wheel steering device 12 of the present steering system and the configuration of the module 50 will be explained. The wheel drive unit 20 incorporated in the module 50 includes: a housing 20a; an electric motor as a drive source and a speed reducer configured to reduce rotation of the electric motor (both the electric motor and the speed reducer are housed in the housing 20a and are not illustrated in FIG. 2); and an axle hub to which the wheel 10b is attached. (The axle hub is hidden and invisible in FIG. 2.) The wheel drive unit 20 is what is called in-wheel motor unit disposed inside a rim of the wheel 10b. The wheel drive unit 20 has a well-known structure, and an explanation thereof is dispensed with.

The module 50 includes a MacPherson-type suspension device (also referred to as a MacPherson strut type suspension device). In the suspension device, the housing 20a of the wheel drive unit 20 functions as a carrier that rotatably holds the wheel. Further, the housing 20a functions also as a steering knuckle in the wheel steering device 12 and is allowed to move upward and downward relative to the vehicle body. The suspension device is constituted by a lower arm 52 as a suspension arm, the housing 20a of the wheel drive unit 20, a shock absorber 54, and a suspension spring 56.

The suspension device has an ordinary structure and will be briefly explained. The lower arm 52 is an L-shaped arm. A proximal end portion of the lower arm 52 is divided into two portions in the front-rear direction of the vehicle. The lower arm 52 is supported at the proximal end portion thereof by a side member (not illustrated) of the vehicle body through a first bushing 58 and a second bushing 60 so as to be pivotable about an arm pivot axis LL. The housing 20a of the wheel drive unit 20 is pivotably coupled at a lower portion thereof to a distal end portion of the lower arm 52 through a ball joint 62, as a first joint, for use in coupling the lower arm 52. The ball joint 62 will be hereinafter referred to as "first joint 62" where appropriate.

The shock absorber 54 is fixedly supported at a lower end thereof to the housing 20a of the wheel drive unit 20 and is supported at an upper end thereof by an upper portion of a the housing of the vehicle body through an upper support 64. The suspension spring 56 is supported at an upper end thereof by the upper portion of the tire housing of the vehicle body through the upper support 64 and is supported at a lower end thereof by a lower support 54a in the form of a flange provided on the shock absorber 54. That is, the suspension spring 56 and the shock absorber 54 are disposed in parallel between the lower arm 52 and the vehicle body.

As described above, the module 50 includes the brake device 36. The brake device 36 is a disc brake device including: a disc rotor 66 attached to the axle hub together with the wheel 10b and configured to rotate with the wheel 10; and a brake caliper 68 held by the housing 20a of the wheel drive unit 20 such that the brake caliper 68 straddles the disc rotor 66. Though not explained in detail, the brake caliper 68 includes brake pads each as a friction member and a hydraulic cylinder. The brake device 36 is configured to generate a braking force for stopping rotation of the wheel 10 by pushing the brake pads against the disc rotor 66 in dependence on the pressure of the working fluid supplied from the working-fluid supply device 34 to the hydraulic cylinder.

The wheel steering device 12 is a single-wheel independent steering device for steering only one of the right and left wheels 10 independently of the other of the right and left wheels 10. The wheel steering device 12 includes the housing 20a of the wheel drive unit 20 functioning as the steering knuckle, a steering actuator 70 provided on the lower turn 52 at a position close to a proximal end portion of the lower arm 52, and a tie rod 72 coupling the steering actuator 70 and the steering knuckle 20a. The housing 20a of the wheel drive unit 20 will be referred to as "steering knuckle 20a" when treated as a constituent element of the wheel steering device 12.

The steering actuator 70 includes a steering motor 70a that is an electric motor as a drive source, a speed reducer 70b for decelerating rotation of the steering motor 70a, and an actuator arm 70c functioning as a pitman arm and configured to be pivoted by the rotation of the steering motor 70a decelerated by the speed reducer 70b. A proximal end portion of the tie rod 72 is coupled to the actuator arm 70c through a ball joint 74, as a second joint, for use in coupling the proximal end portion of the tie rod 72. (The ball joint 74 will be hereinafter referred to as "second joint 74" where appropriate.) A distal end portion of the tie rod 72 is coupled to a knuckle arm 20b of the steering knuckle 20a through a ball joint 76, as a third joint, for use in coupling the distal end portion of the tie rod 72. (The ball joint 76 will be hereinafter referred to as "third joint 76" where appropriate.)

In the wheel steering device 12, a line connecting the center of the upper support 64 and the center of the first joint 62 is the kingpin axis KP. By the motion of the steering motor 70a, the actuator arm 70c of the steering actuator 70 pivots about an actuator axis AL as indicated by a bold arrow in FIG. 2, and the pivotal movement of the actuator arm 70c is transmitted to the steering knuckle 20a by the tie rod 72, so that the steering knuckle 20a is rotated about the kingpin axis KP. That is, the wheel 10 is steered as indicated by a bold arrow in FIG. 2. Thus, the wheel steering device 12 includes a motion converting mechanism 78 constituted by the actuator arm 70c, the tie rod 72, the knuckle arm 20b, etc., for converting the rotating motion of the steering motor 70a into the steering motion of the wheel 10.

In the wheel steering device 12, the steering actuator 70 is disposed on the lower arm 52. Thus, a work of mounting the module 50 on the vehicle body can be easily performed. That is, the proximal end portion of the lower arm 52 is attached to the side member of the vehicle body, and the upper support 64 is attached to the upper portion of the tire housing of the vehicle body, whereby the suspension device, the brake device, and the wheel steering device can be mounted on the vehicle. In other words, the module 50 is excellent in mountability on the vehicle.

The operating device 14 has a configuration known in the steer-by-wire steering system. As illustrated in FIG. 1, the operating device 14 includes: a steering wheel 80, as a steering operating member, operated by the driver; a steering sensor 82 for detecting a steering operation angle that is a rotation angle of the steering wheel 80 as an operation amount of the steering operating member from a position thereof in straight running of the vehicle; and a reaction-force applying device 84 configured to apply an operation reaction force to the steering wheel 80. The reaction-force applying device 84 includes a reaction force motor 84a that is an electric motor as a source of the reaction force and a speed reducer 84b for transmitting a force of the reaction force motor 84a to the steering wheel 80.

C. Control of Vehicle Steering System i) Basic Control

In the present steering system, the operating ECU 18 determines, as a target of the steering angle $\psi$ that is the steering amount of each from wheel 10F, a target steering angle $\psi_L^*$ of the front left wheel 10FL and a target steering angle $\psi_R^*$ of the front right wheel 10FR. Based on the determined target steering angles $\psi_L^*$, $\psi_R^*$, the steering ECUs 16 control the corresponding wheel steering devices 12 to steer the front left wheel 10FL and the front right wheel 10FR such that steering angles $\psi_L$, $\psi_R$ thereof become equal to the target steering angles $\psi_L^*$, $\psi_R^*$.

Specifically, the operating ECU 18 determines a target vehicle-body slip angle $\beta_S^*$ that is a vehicle-body slip angle $\beta_S$ to be attained in the vehicle body, based on the steering request namely, based on the steering operation angle $\delta$ obtained by the steering sensor 82. In this respect, in a case where the vehicle is performing automated driving, information on the target vehicle-body slip angle $\beta_S^*$ is sent as the steering request from an automated driving system (not illustrated) via the CAN 44. It is noted that the operating ECU 18 regards the steering request for straight running as being made also in a situation in which the steering wheel 80 is not being operated or a situation in which the automated driving system makes an instruction to run straight. In this instance, the operating ECU 18 determines the target vehicle-body slip angle $\beta_S^*$ to be "0".

The operating ECU 18 determines the target steering angles $\psi_L^*$, $\psi_R^*$ that are targets of the steering angles $\psi_L$, $\psi_R$ of the front left wheel 10FL and the front right wheel 10FR. A ratio between the steering amount of the front left wheel 10FL and the front right wheel 10FR, i.e., a steering amount ratio, may be suitably set. In the present steering system, the target steering angles $\psi_L^*$, $\psi_R^*$ of the front left and right wheels 10FL, 10FR are set so as to be equal to each other according to the parallel geometry for convenience sake. In a strict sense, the target steering angles $\psi_L^*$, $\psi_R^*$ are opposite in sign (+, −). The target steering angles $\psi_L^*$, $\psi_R^*$ determined in the basic control will be referred to as standard steering angles $\psi_L^*$, $\psi_R^*$ each as a standard steering amount in relation to opposite-phase shift steering that will be later explained. Here, the vehicle-body slip angle $\beta_S$ at a time when the front wheels 10FL, 10FR are steered respectively by the standard steering angles $\psi_L^*$, $\psi_R^*$ is defined as a standard vehicle-body slip angle. In this instance, the target vehicle-body slip angle $\beta_S^*$ determined as described above may be regarded as the standard vehicle-body slip angle. The operating ECU 18 transmits, via the CAN 44, information on the determined target steering angle $\psi_L^*$ and information on the determined target steering angle $\psi_R^*$ respectively to the steering ECUs 16 corresponding to the respective front left and right wheels 10F.

Each steering ECU 16 controls the corresponding wheel steering device 12 such that the steering angle $\psi$ of the corresponding front wheel 10F becomes equal to the target steering angle $\psi^*$ transmitted thereto. Specifically, the wheel steering device 12 is not equipped with a steering angle sensor for directly detecting the steering angle $\psi$ of the wheel 10. In the present steering system, therefore, the steering ECU 16 controls a steering force generated by the steering actuator 70 based on a rotation angle $\theta$ of the steering motor 70a (hereinafter referred to as "motor rotation angle") utilizing a specific relationship between the steering angle ψ of the wheel 10 and the rotation angle θ of the steering motor 70a. The steering force generated by the steering actuator 70 is equivalent to a steering torque Tq generated by the steering motor 70a. Thus, the steering ECU 16 determines a target steering torque Tq* that is the steering torque Tq to be generated by the steering motor 70a, based on the motor rotation angle θ of the steering motor 70a. In this respect, the motor rotation angle θ is regarded as a displacement angle of a motor shaft from a state in which the vehicle is running straight. The motor rotation angle θ is accumulated over 360°.

The target steering torque Tq is determined as follows. The steering ECU 16 determines, for the corresponding front wheel 10F, a target motor rotation angle θ* that is a target of the motor rotation angle θ, based on the target steering angle ψ*. The steering motor 70a is a brushless DC motor and includes a motor rotation angle sensor (such as a Hall IC or a resolver) for phase switching in supplying the electric current thereto. Based on the detection by the motor rotation angle sensor, the steering ECU 16 recognizes an actual motor rotation angle θ that is the motor rotation angle θ at the present time point with respect to a reference motor rotation angle. The steering ECU 16 obtains a motor rotation angle deviation Δθ that is a deviation of the actual motor rotation angle θ with respect to the target motor rotation angle θ*. Based on the motor rotation angle deviation Δθ(=θ*−θ), the steering ECU 16 determines the target steering torque Tq according to the following expression:

$$Tq^* = G_P \cdot \Delta\theta + G_D \cdot (d\Delta\theta/dt) + G_I \cdot \int \Delta\theta dt$$

The above expression is an expression according to a feedback control law based on the motor rotation angle deviation Δθ. The first term, the second term, and the third term in the expression are a proportional term, a derivative term, and an integral term, respectively. Further, $G_P$, $G_D$, $G_I$ represent a proportional gain, a derivative gain, and an integral gain, respectively.

The steering torque Tq and a supply current $I_S$ to the steering motor 70a are in a specific relationship relative to each other. In other words, the steering torque Tq depends on the force generated by the steering motor 70a, and the steering torque Tq and the supply current $I_S$ are generally proportional to each other. Accordingly, the steering ECU 16 determines, based on the target steering torque Tq*, a target supply current $I_S$* that is a target of the supply current $I_S$ to the steering motor 70a and supplies, to the steering motor 70a, an electric current based on the target supply current $I_S$*.

The operating ECU 18 executes a control for applying, to the steering wheel 80, an operation reaction force that is a reaction force against a steering operation, i.e., an operation reaction force control. The operation reaction force control is an ordinary control, and the operation reaction force can be determined according to various techniques. In the steering system of the present embodiment, the operating ECU 18 determines, as a target operation reaction force, a target reaction force torque $Tq_C$* that is a reaction force torque $Tq_C$ to be generated by the reaction force motor 84a of the reaction-force applying device 84, according to a typical technique, namely, according to the following expression:

$$Tq_C^* = G\delta \cdot \delta + G_v \cdot v + G_T \cdot (Tq_L + Tq_R)/2$$

In the above expression, Gδ, $G_v$, $G_T$ are weighting gains respectively relating to the steering operation angle δ, the vehicle speed v, and an actual steering torque Tq identified by each steering ECU 16. That is, the reaction force torque $Tq_C$ to be applied increases with an increase in the steering operation angle δ, with an increase in the vehicle speed v, and with an increase in the steering torque Tq. Concerning the actual steering torque Tq, the steering torque Tq of the front left wheel 10F and the steering torque Tq of the front right wheel 10F will be respectively referred to as a left-wheel steering torque $Tq_L$ and a right-wheel steering torque $Tq_R$ where appropriate. The operating ECU 18 identifies the vehicle speed v based on: the wheel speeds $v_W$ of the two front wheels 10F each of which depends on the rotational speed of the electric motor of the corresponding wheel drive unit 20; and the wheel speeds $v_W$ of the two rear wheels 10R each of which depends on detection by the corresponding wheel speed sensor 48.

The operating ECU 18 determines, based on the target reaction force torque $Tq_C$* determined as described above, the target supply current $I_C$* as a target of the supply current $I_C$ to the reaction force motor 84a and supplies, to the reaction force motor 84a, an electric current based on the target supply current $I_C$*.

ii) Estimation of Friction Coefficient of Road Surface

In the steering system of the present embodiment, the operating ECU 18 as the controller estimates a friction coefficient of a road surface on which the vehicle is running. Specifically, the operating ECU 18 shifts, during running of the vehicle, the steering angles $\psi_L$, $\psi_R$ of the front left and right wheels 10F and identifies that the vehicle is running on a low-μ road that is a road with a low road surface μ, based on the steering torques $Tq_L$, $Tq_R$ in a state in which the steering angles $\psi_L$, $\psi_R$ are shifted.

In a state in which the vehicle speed v is low, a large steering torque Tq is required for steering the wheel 10 when the road surface μ is large whereas a small steering torque Tq can steer the wheel 10 when the road surface μ is small. Further, a self aligning torque acts on the wheel 10. Accordingly, to steer the wheel 10 by the steering angle ψ or to maintain the wheel 10 at the steering angle ψ, the wheel 10 needs to be steered or needs to be maintained at the steering angle ψ against the self aligning torque. In this instance, the steering torque Tq to be required increases with an increase in the vehicle speed v and with an increase in the steering angle ψ. The steering torque Tq to be required also increases with an increase in the road surface μ and decreases with a decrease in the road surface μ.

In view of the above, the road surface μ is estimated in the present steering system by shifting the steering angles $\psi_L$, $\psi_R$ of the front left and right wheels 10F. If the steering angles $\psi_L$, $\psi_R$ of the front left and right wheels 10F are shifted in the same direction during running of the vehicle, however, the vehicle-body slip angle $\beta_S$ changes, so that the running stability of the vehicle (that is a concept including the turning stability) may be impaired. Therefore, the present steering system executes opposite-phase shift steering in which the steering angles $\psi_L$, $\psi_R$ of the front left and right wheels 10F are shifted in mutually opposite directions.

The opposite-phase shift steering is executed by shifting the standard steering angles $\psi_L$*, $\psi_R$* described above. An amount of shift of each standard steering angle $\psi_L$*, $\psi_R$* is defined as a shift amount Δψ. The operating ECU 18 periodically varies the shift amount Δψ for shortening a length of time during which the shift amount Δψ is large. The shift amount Δψ is represented as a function using a lapse of a time t as a parameter, namely, as the following function:

$$\Delta\psi = f(t)$$

The operating ECU 18 shifts the target steering angles $\psi_L$*, $\psi_R$* of the front left and right wheels 10F from the respective standard steering angles $\psi_L^*$, $\psi_R^*$ by the respective shift amounts $\Delta\psi$. Specifically, when the shift amount of the front left wheel 10F is defined as $\Delta\psi_L$ and the shift amount of the front right wheel is defined as $\Delta\psi_R$, the target steering angles $\psi_L^*$, $\psi_R^*$ of the front left and right wheels 10F are varied respectively according to the following expressions:

$$\psi_L^* = \psi_L^* + \Delta\psi_L$$

$$\psi_R^* = \psi_R^* + \Delta\psi_R$$

Figure 3A:
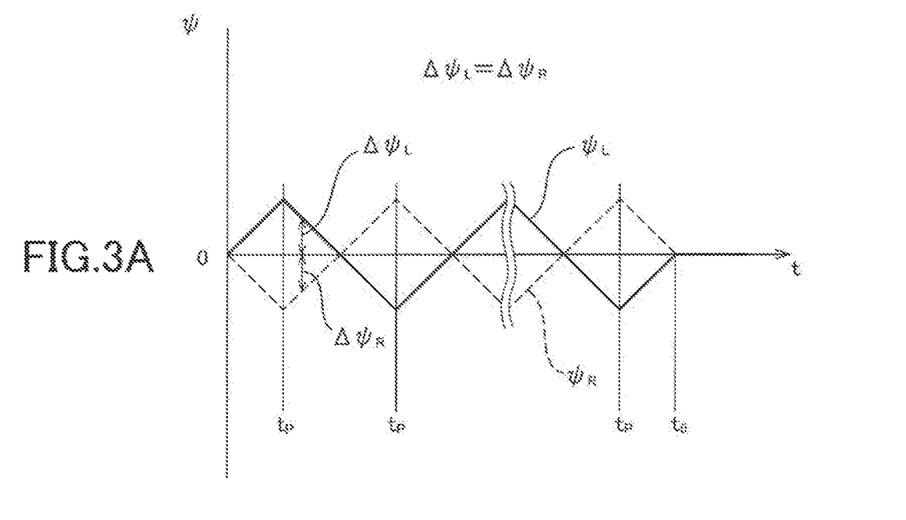
FIG. 3A is a graph for explaining opposite-phase shift steering executed in straight running of the vehicle by the steering system of the embodiment.
Figure 3B:
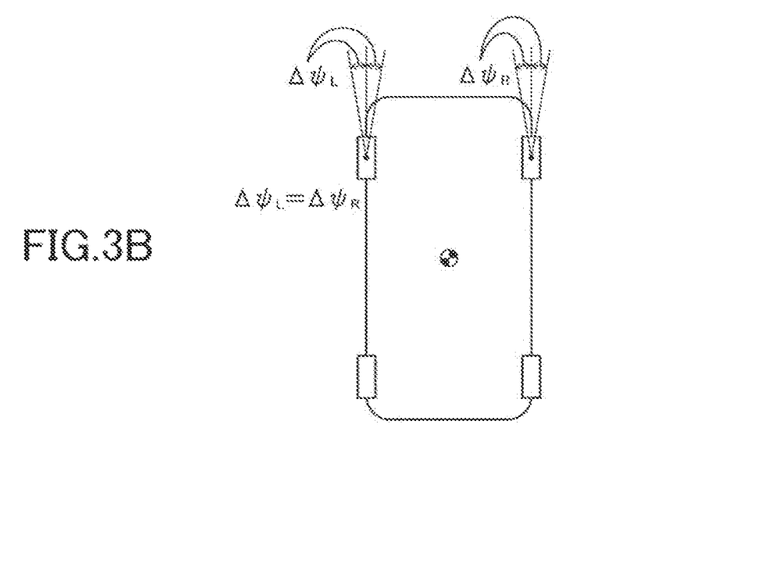
FIG. 3B is a schematic view for explaining the opposite-phase shift steering executed in straight running of the vehicle by the steering system of the embodiment.

Specifically, when the vehicle is running straight, both the shift amount $\Delta\psi_L$ of the front left wheel 10F and the shift amount $\Delta\psi_R$ of the front right wheel 10F are made equal to each other, i.e., $\Delta\psi$. The target steering angles $\psi_L^*$, $\psi_R^*$ of the front left and right wheels 10F change as indicated in FIG. 3A, and the steering angles $\psi_L$, $\psi_R$ of the front left and right wheels 10F vary periodically as indicated in FIG. 3B. thus, even when the opposite-phase shift steering is executed, the vehicle-body slip angle $\beta_S$ is maintained at the target vehicle-body slip angle $\beta_S^*$.

When the vehicle is turning, in contrast, the load of the vehicle body shared or received by the turning outer wheel is larger than that of the turning inner wheel due to the centrifugal force. In view of this, the shift amount $\Delta\psi$ of the front wheel 10F as the turning outer wheel is made smaller than the shift amount $\Delta\psi$ of the front wheel 10F as the turning inner wheel. Specifically, when the vehicle is turning leftward, the shift amounts $\Delta\psi_L$, $\Delta\psi_R$ of the front left and right wheels 10F are determined respectively according to the following expressions:

$$\Delta\psi_L = \Delta\psi \times \tau_I$$

$$\Delta\psi_R = \Delta\psi \times \tau_O$$

When the vehicle is turning rightward, the shift amounts $\Delta\psi_L$, $\Delta\psi_R$ of the front left and right wheels 10F are determined respectively according to the following expressions:

$$\Delta\psi_L = \Delta\psi \times \tau_O$$

$$\Delta\psi_R = \Delta\psi \times \tau_I$$

In the above expressions, "$\tau_O$" is a weighting coefficient for the turning outer wheel, and "$\tau_I$" is a weighting coefficient for the turning inner wheel. The weighting coefficients $\tau_O$, $\tau_I$ are defined as follows:

$$\tau_O < \tau_I \leq 1$$

The weighting coefficients $\tau_O$, $\tau_I$ are determined based on an actual yaw rate $\gamma$ detected by the yaw rate sensor 46 so as to allow the vehicle-body slip angle $\beta_S$ to be maintained at the target vehicle-body slip angle $\beta_S^*$.

Figure 4A:
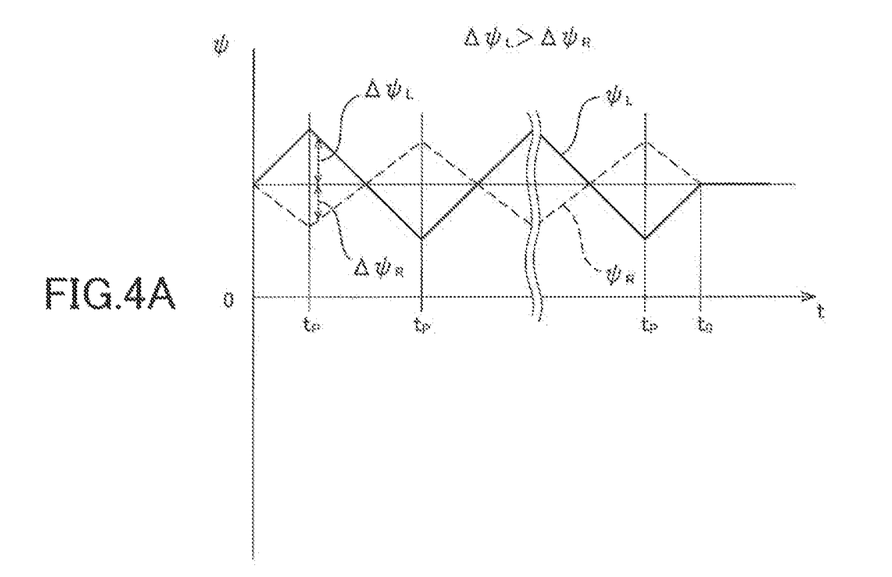
FIG. 4A is a graph for explaining opposite-phase shift steering executed in turning of the vehicle by the steering system of the embodiment.
Figure 4B:
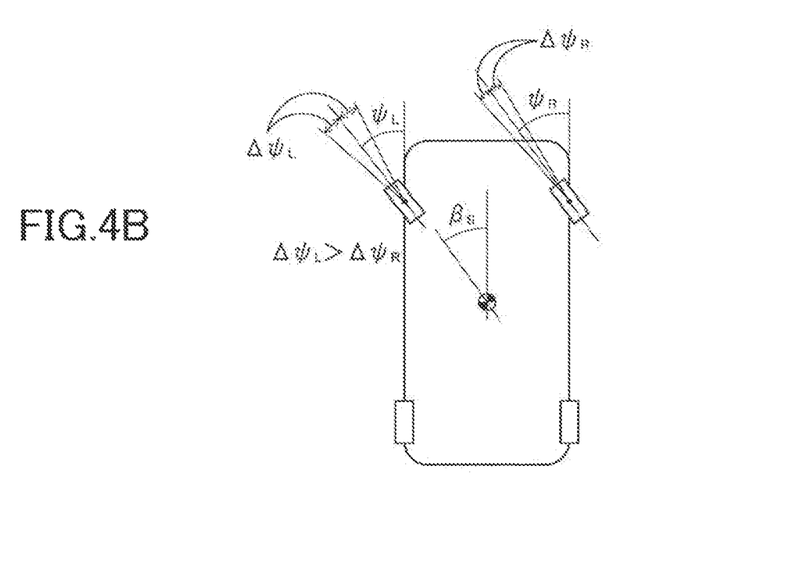
FIG. 4B is a schematic view for explaining the opposite-phase shift steering executed in turning of the vehicle by the steering system of the embodiment.

Accordingly, when the vehicle is turning leftward, for instance, the target steering angles $\psi_L^*$, $\psi_R^*$ of the front left and right wheels 10F change as indicated in FIG. 4A, and the steering angles 104 $_L$, $\psi_R$ of the front left and right wheels 10F vary periodically as indicated in FIG. 4B.

In the steering system of the present embodiment, the road surface $\mu$ is estimated in view of steering of the wheels 10 against the self aligning torque described above. The operating ECU 18 executes the opposite-phase shift steering on conditions that the vehicle speed v is not lower than a set vehicle speed $v_0$ (e.g., 30 km/h) and the behavior of the vehicle body is appropriate. In this respect, the operating ECU 18 identifies that the behavior of the vehicle body is appropriate when the actual yaw rate $\gamma$ detected by the yaw rate sensor 46 falls within a permissible yaw rate range $\gamma^*$ that is obtained by providing a margin $\pm\Delta\gamma_M$ with respect to a target yaw rate $\gamma^*$ that is determined based on the vehicle speed v and the target vehicle-body slip angle $\beta_S^*$.

The operating ECU 18 executes the opposite-phase shift steering in which one unit of the opposite-phase shift steering includes a plurality of periods. Each steering ECU 16 detects the actual supply current $I_S$ being actually supplied to the corresponding steering motor 70a and identifies, based on the detected actual supply current $I_S$, the actual steering torque Tq for each of the front left and right wheels that is the steering torque Tq being actually generated. Each steering ECU 16 transmits information on the actual steering torque Tq. The operating ECU 18 receives the information from each steering ECU 16 to obtain the actual steering torque Tq for each of the front left and right wheels 10F and stores the actual steering torque Tq at a time point $t_P$ when the shift amount $\Delta\psi$ is at its peak in each period among a plurality of periods of variation of the shift amount $\Delta\psi$. Specifically, the actual steering torque Tq depends on the vehicle speed v and the vehicle-body slip angle $\beta_S$. Accordingly, for utilizing the actual steering torque Tq as a parameter for estimating the road surface $\mu$, the operating ECU 18 standardizes the actual steering torque Tq based on the vehicle speed v and the target vehicle-body slip angle $\beta_S$, so as to obtain and store the standard torques $Tq_{LS}$, $Tq_{RS}$ of the respective front left and right wheels 10F. In this respect, each of the standard torques $Tq_{LS}$, $Tq_{RS}$ may be regarded as a unified torque that is not associated with the vehicle speed v and the vehicle-body slip angle $\beta_S$.

When a set time $t_0$ (hereinafter referred to as "unit shift time $t_0$" where appropriate) corresponding to a plurality of periods elapses and one unit of the opposite-phase shift steering has been executed, the operating ECU 18 estimates the road surface $\mu$ based on the stored standard torques $Tq_{LS}$, $Tq_{RS}$ of the front left and right left wheels 10F. Specifically, the operating ECU 18 determines whether at least one of the stored standard torques $Tq_{LS}$ of the front left wheel 10F is smaller than a threshold and whether at least one of the stored standard torques $Tq_{RS}$ of the front right wheel 10F is smaller than the threshold. When at least one of the standard torques $Tq_{LS}$ and/or at least one of the standard torques $Tq_{RS}$ is smaller than the threshold, the operating ECU 18 identifies that the vehicle is running on the low-$\mu$ road (the low friction coefficient road). There are prepared, as the threshold, two threshold torques, i.e., a first threshold torque $Tq_1$ and a second threshold torque $Tq_2$ smaller than the first threshold torque $Tq_1$. When i) at least one of the standard torques $Tq_{LS}$ and/or at least one of the standard torques $Tq_{RS}$ is smaller than the first threshold torque $Tq_1$ and ii) none of the standard torques $Tq_{LS}$, $Tq_{RS}$ are smaller than the second threshold torque $Tq_2$, the operating ECU 18 identifies that the road on which the vehicle is running is a first low-$\mu$ road whose road surface $\mu$ is smaller than normal. When at least one of the standard torques $Tq_{LS}$ and/or at least one of the standard torques $Tq_{RS}$ is smaller than the second threshold torque $Tq_2$, the operating ECU 18 identities that the road on which the vehicle is running is a second low-$\mu$ road whose road surface $\mu$ is smaller than that of the first low-$\mu$ road. Thus, each of the first threshold torque $Tq_1$ and the second threshold torque Tq may be considered as a set steering force for identifying that the vehicle is running on the low-$\mu$ road.

In other words, the steering system of the present embodiment is configured such that the operating ECU 18 identifies that the vehicle is running on the low-$\mu$ road when the steering force of at least one of the left and right wheels in the opposite-phase shift steering is smaller than the set steering force. Further, the steering system is configured to estimate, in steps, the degree of the road surface μ in accordance with the degree of the steering force applied to each front wheel 10F.

When identifying that the vehicle is running on the low-μ road, the operating ECU 18 controls a warning device 86 (FIG. 1) provided in an instrument panel of the vehicle to issue a warning. The warning is one example of a notifying process for notifying the driver that the vehicle is running on the low-μ road. The warning device 86 includes a display and a speaker and issues a warning by indicating an image on the display and by emitting sound from the speaker.

As another notifying process, the operating ECU 18 makes the operation reaction force smaller in the operation reaction force control when the vehicle is running on the low-μ road than when the vehicle is not running on the low-μ road. Specifically, the operating ECU 18 reduces the target reaction force torque $Tq_C^*$ by a torque reduction amount $\Delta Tq_C$ when the vehicle is running on the low-μ road. There are prepared, as the torque reduction amount $\Delta Tq_C$, a first torque reduction amount $\Delta Tq_{C1}$ and a second torque reduction amount $\Delta Tq_{C2}$ ($>\Delta Tq_{C1}$) for further reducing the reaction force torque $Tq_C$. The target reaction force torque $Tq_C^*$ is reduced by the first torque reduction amount $\Delta Tq_{C1}$ when at least one of the front right and left wheels 10F is passing over the first low-μ road and neither of the front right and left wheels 10F is passing over the second low-μ road. The target reaction force torque $Tq_C^*$ is reduced by the second torque reduction amount $\Delta Tq_{C2}$ when at least one of the front right and left wheels 10F is passing over the second low-μ road.

The notifying process described above enables the driver to aware that the vehicle is running on the low-μ road before the behavior of the vehicle becomes unstable due to the low-μ road, in other words, without suffering from unstableness in the behavior of the vehicle due to the low-μ road. Further, by reducing the operation reaction force in two steps as described above, the driver can recognize the degree of the low-μ road, namely, the degree of the road surface μ. When the steering torque Tq of only one of the from right and left wheels 10F is smaller than the threshold, it can be identified that the vehicle is running on what is called split μ road. In this case, the warning device may issue a warning that the vehicle is running on the split μ road.

iii) Control Flow

Figure 5:
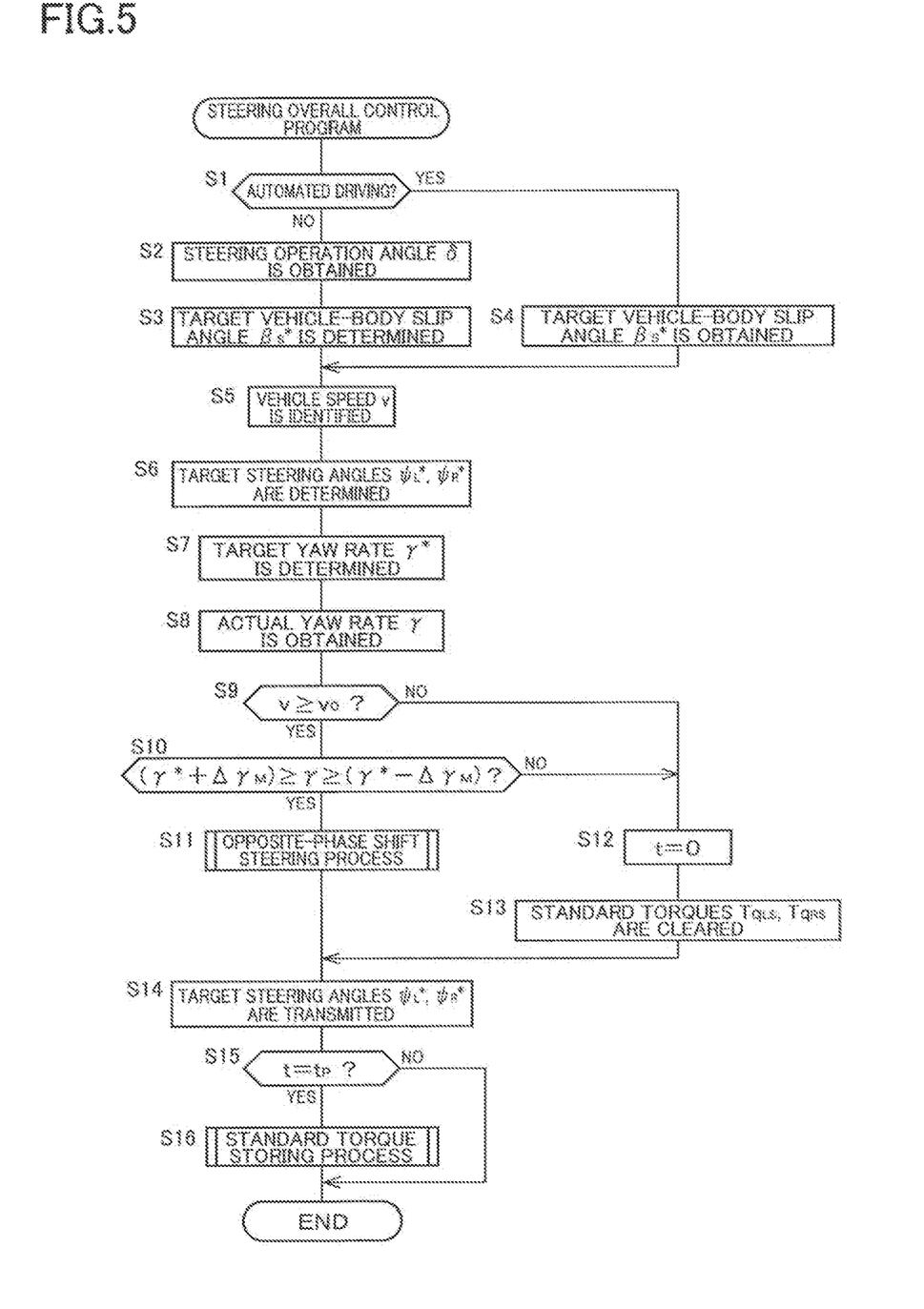
FIG. 5 is a flowchart indicating a steering overall control program executed by the steering system of the embodiment.
Figure 6:
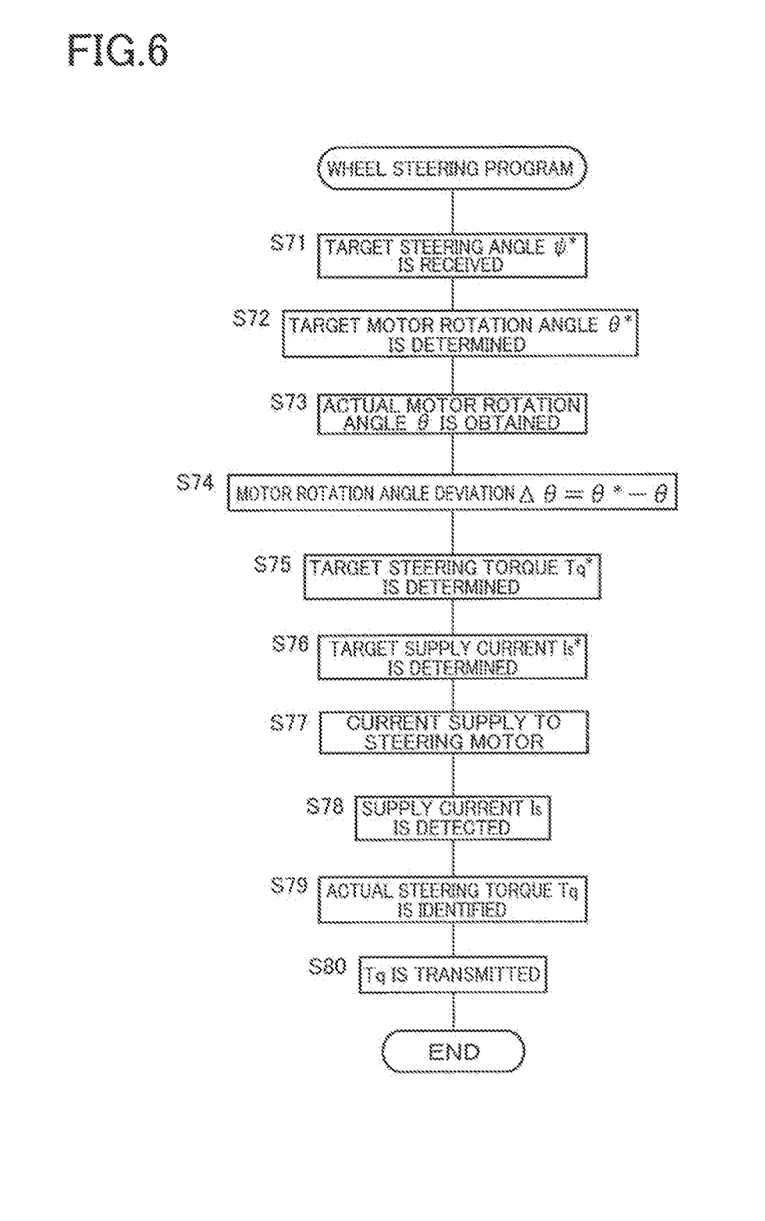
FIG. 6 is a flowchart indicating a wheel steering program executed by the steering system of the embodiment.
Figure 7:
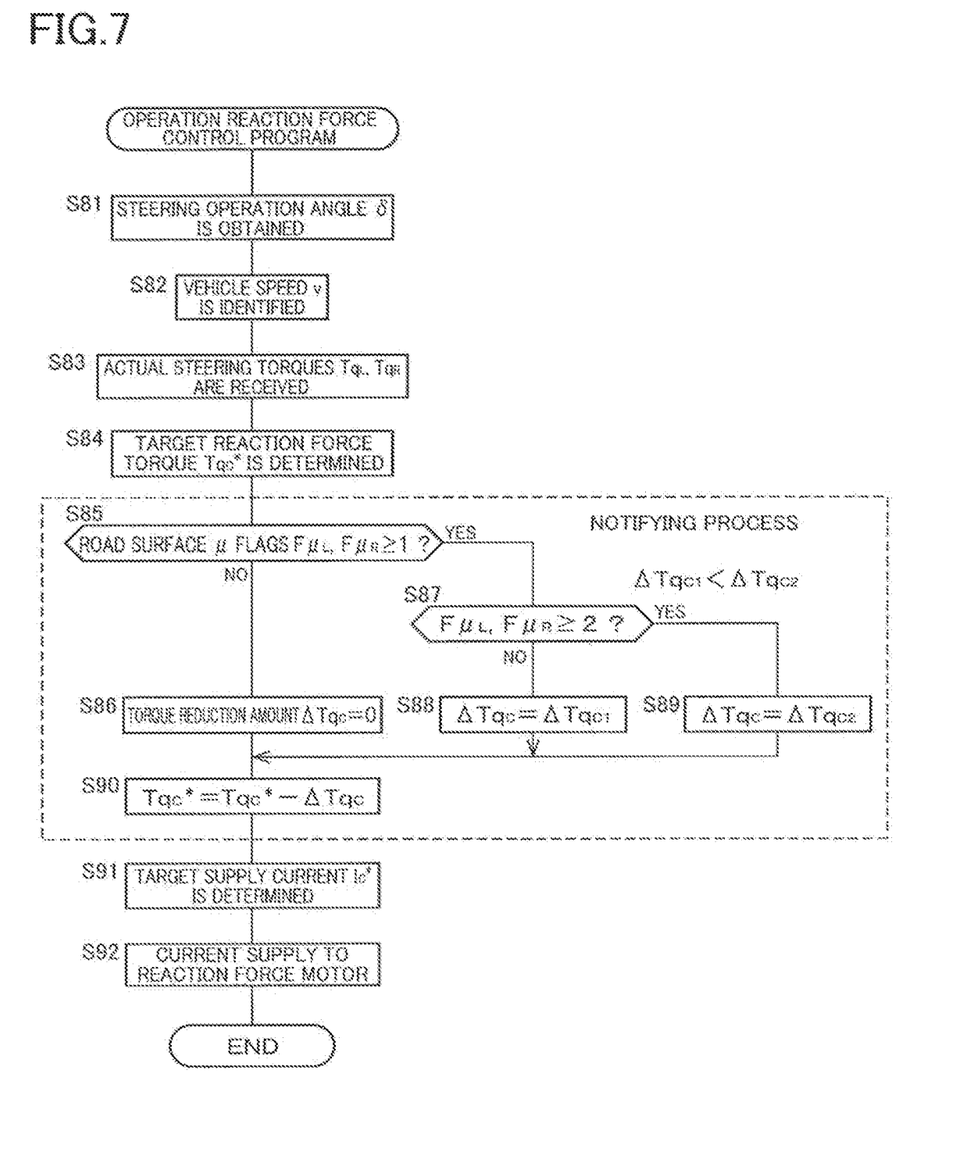
FIG. 7 is a flowchart indicating an operation reaction force control program executed by the vehicle steering system of the embodiment.

The computer of the operating ECU 18 repeatedly executes a steering overall control program indicated by a flowchart of FIG. 5, the computer of each steering ECU 16 repeatedly executes a wheel steering program indicated by a flowchart of FIG. 6, and the computer of the operating ECU 18 repeatedly executes an operation reaction force control program indicated by a flowchart of FIG. 7, at a short time pitch, e.g., from several to several tens of milliseconds (msec), whereby the control of the present steering system is executed. There will be hereinafter explained processes according to the flowcharts of the respective programs to briefly explain a flow of the control of the steering system.

In the process according to the steering overall control program, it is determined at Step 1 whether the automated driving is being performed. (Step 1 is abbreviated as "S1", and other steps will be similarly abbreviated.) When the automated driving is not being performed, the steering operation angle δ is obtained at S2 based on detection by the steering sensor 82. At S3, the target vehicle-body slip angle $\beta_S^*$ is determined based on the steering operation angle δ. When the automated driving is being performed, the target vehicle-body slip angle $\beta_S^*$ is obtained at S4 based on information from the automated driving system.

At S5, the vehicle speed v is identified. At S6, the target steering angles $\psi_L^*$, $\psi_R^*$ of the front left and right wheels 10F are determined based on the target vehicle-body slip angle $\beta_S^*$. At S7, the target yaw rate γ* is determined based on the vehicle speed v and the target vehicle-body slip angle $\beta_S^*$. At S8, the actual yaw rate γ is obtained based on detection by the yaw rate sensor 46.

At S9, it is determined whether the vehicle speed v is not lower than the set vehicle speed $v_0$. At S10, it is determined whether the actual yaw rate γ falls within the permissible yaw rate range. The permissible yaw rate range is for identifying that the vehicle is running appropriately. The permissible yaw rate range is obtained by providing a margin with respect to the target yaw rate γ*. When the vehicle speed v is not lower than the set vehicle speed $v_0$ and the actual yaw rate γ falls within the permissible yaw rate range, the opposite-phase shift steering process is executed at S11. When the vehicle speed v is lower than the set vehicle speed $v_0$ or when the actual yaw rate γ does not fall within the permissible yaw rate range, a time counter t (that will be explained) is reset at S12. At S13, the standard torques $Tq_{LS}$, $Tq_{RS}$ stored in the memory of the computer (that will be described) are cleared.

Figure 8:
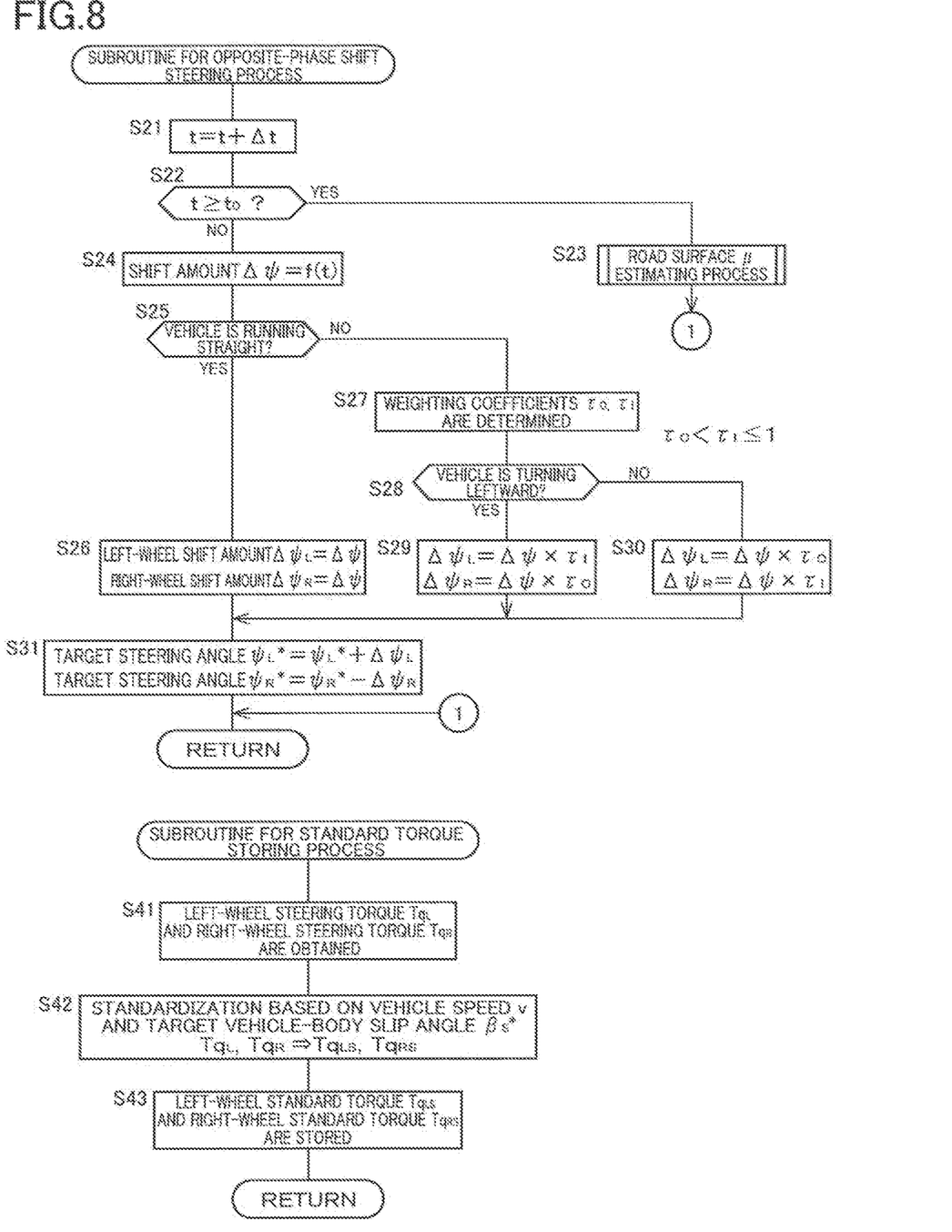
FIG. 8 illustrates a flowchart indicating a subroutine for an opposite-phase shift steering process and a flowchart indicating a subroutine for a standard torque storing process both executed in the steering overall control program.

The opposite-phase shift steering process of S11 is executed by executing a subroutine for the opposite-phase shift steering process indicated by a flowchart of FIG. 8. In this process, the time counter t is incremented at S21 by a time Δt corresponding to a pitch at which the program is executed. The time counter t is for recognizing completion of one unit of the opposite-phase shift steering. The value of the time counter t at a start time point of one unit of the opposite-phase shift steering, namely, an initial value of the time counter t, is "0". At S22, it is determined whether the value of the time counter t has reached a unit shift time $t_0$, in other words, it is determined whether one unit of the opposite-phase shift steering has been completed. When it is determined that the time counter t has reached the unit shift time $t_0$, a road surface μ estimating process (that will be explained) is executed at S23. When it is determined that the time counter t does not yet reach the unit shift time $t_0$, the shift amount Δψ to be attained at the present time point is determined at S24 based on the function f(t) explained above.

After the shift amount Δψ has been determined, it is determined at S25 based on the target vehicle-body slip angle $\beta_S^*$ whether the vehicle is running straight. When the vehicle is running straight, the control flow proceeds to S26 at which the left-wheel shift amount $\Delta\psi_L$ that is the shift amount of the front left wheel 10F and the right-wheel shift amount $\Delta\psi_R$ that is the shift amount of the front right wheel 10F are both made equal to the determined shift amount Δψ. When the vehicle is not running straight, namely, when the vehicle is turning, the weighting coefficients $\tau_O$, $\tau_I$ explained above are determined at S27 as explained above based on the actual yaw rate γ detected by the yaw rate sensor 46. At S28, it is determined whether the vehicle is turning leftward based on the target vehicle-body slip angle $\beta_S^*$. When the vehicle is turning leftward, the control flow proceeds to S29 at which the left-wheel shift amount $\Delta\psi_L$ is made equal to a value obtained by multiplying the determined shift amount Δψ by the weighting coefficient $\tau_I$ for the turning inner wheel, and the right-wheel shift amount $\Delta\psi_R$ is made equal to a value obtained by multiplying the determined shift amount Δψ by the weighting coefficient $\tau_O$ for the turning outer wheel. On the other hand, when the vehicle is not turning leftward, namely, when the vehicle is turning rightward, the control flow proceeds to S30 at which the left-wheel shift amount $\Delta\psi_L$ is made equal to a value obtained by multiplying the determined shift amount $\Delta\psi$ by the weighting coefficient $\tau_O$ for the turning outer wheel, and the right-wheel shift amount $\Delta\psi_R$ is made equal to a value obtained by multiplying the determined shift amount $\Delta\psi$ by the weighting coefficient $\tau_I$ for the turning inner wheel. After the shift amounts $\Delta\psi_L$, $\Delta\psi_R$ of the front left and right wheels 10F have been determined, the control flow proceeds to S31 at which the left-wheel shift amount $\Delta\psi_L$ is added to the already determined target steering angle $\psi_L^*$ of the front left wheel 10F and the right-wheel shift amount $\Delta\psi_R$ is subtracted from the already determined target steering angle $\psi_R^*$ of the front right wheel 10F. After the target steering angles $\psi_L^*$, $\psi_R^*$ of the front left and right wheels 10F for executing the opposite-phase shift steering have been thus determined, the process according to the subroutine is ended.

After execution of the opposite-phase shift steering process or after skipping of the opposite-phase shift steering process, the control flow proceeds to S14 at which information on the determined target steering angles $\psi_L^*$, $\psi_R^*$ is transmitted to the corresponding steering ECUs 16. At S15, it is determined whether the value of the time counter t has reached a peak time point $t_P$. When the value of the time counter t has reached the peak time point $t_P$, a standard torque storing process of S16 is executed. When the value of the time counter t does not yet reach the peak time point $t_P$, the standard torque storing process of S16 is skipped and one execution of the steering overall control program is ended.

The standard torque storing process of S16 is executed by executing a subroutine for the standard torque storing process indicated by a flowchart of FIG. 8. In the process according to the subroutine, the left-wheel steering torque $Tq_L$ and the right-wheel steering torque $Tq_R$, which are the actual steering torques Tq of the respective front left and right wheels 10F, are obtained at S41 based on the information transmitted from the steering ECUs 16. At S42, the left-wheel steering torque $Tq_L$ and the right-wheel steering torque $Tq_R$ are standardized as explained above based on the vehicle speed v and the target vehicle-body slip angle $\beta_S^*$, so as to determine the left-wheel standard torque $Tq_{LS}$ and the right-wheel standard torque $Tq_{RS}$ that are the standard torques of the respective front left and right wheels 10F. At S43, the left-wheel standard torque $Tq_{LS}$ and the right-wheel standard torque $Tq_{RS}$ are stored in the memory of the computer.

As explained above, when the value of the time counter t reaches the unit shift time $t_0$ at S22 during execution of the opposite-phase shift steering process, the road surface $\mu$ estimating process is executed at S23. The road surface $\mu$ estimating process is executed by executing a subroutine for the road surface $\mu$ estimating process indicated by a flowchart of FIG. 9.

Figure 9:
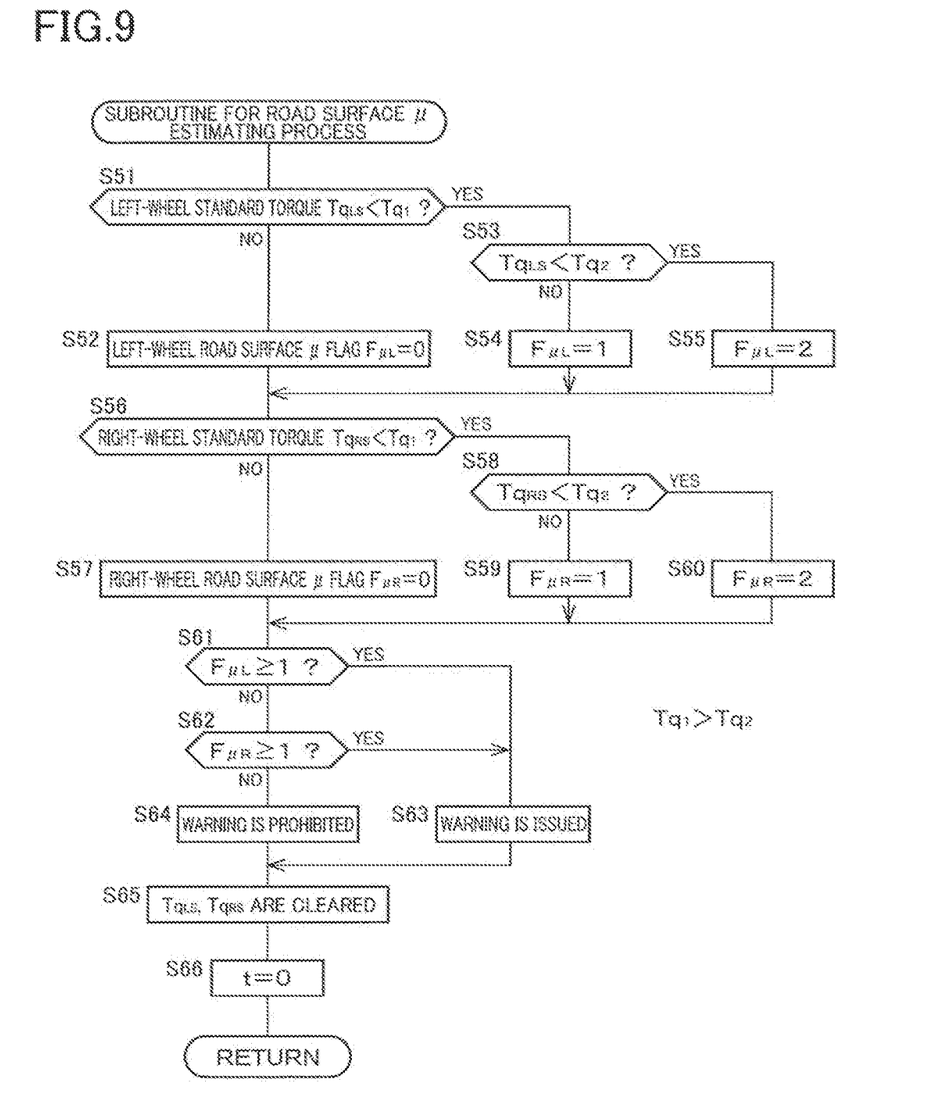
FIG. 9 is a flowchart indicating a subroutine for a road surface μ estimating process executed in the steering overall control program.

In the process according to the subroutine for the road surface $\mu$ estimating process, it is determined at S51 whether at least one of the stored left-wheel standard torques $Tq_{LS}$ is smaller than the first threshold torque $Tq_i$. When none of the stored left-wheel standard torques $Tq_{LS}$ are smaller than the first threshold torque $Tq_i$, a left-wheel road surface $\mu$ flag $F\mu_L$ is set to "0" at S52. That is, it is identified that the road surface on which the front left wheel 10F is passing is not the low-$\mu$ road. When at least one of the stored left-wheel standard torques $Tq_{LS}$ is smaller than the first threshold torque $Tq_1$, it is determined at S53 whether at least one of the stored left-wheel standard torques $Tq_{LS}$ is smaller than the second threshold torque $Tq_2$. When none of the stored left-wheel standard torques $Tq_{LS}$ are smaller than the second threshold torque $Tq_2$, the left-wheel road surface $\mu$ flag $F\mu_L$ is set to "1" at S54. That is, the road surface on which the front left wheel 10F is passing is the first low-$\mu$ road. When at least one of the stored left-wheel standard torques $Tq_{LS}$ is smaller than the second threshold torque $Tq_2$, the left-wheel road surface $\mu$ flag $F\mu_L$ is set to "2" at S55. That is, it is identified that the road surface on which the front left wheel 10F is passing is the second low-$\mu$ road.

At S56, it is determined whether at least one of the stored right-wheel standard torques $Tq_{RS}$ is smaller than the first threshold torque $Tq_1$. When none of the stored right-wheel standard torques $Tq_{RS}$ are smaller than the first threshold torque $Tq_1$, a right-wheel road surface $\mu$ flag $F\mu_R$ is set to "0" at S57. That is, it is identified that the road surface on which the front right wheel 10F is passing is not the low-$\mu$ road. When at least one of the stored right-wheel standard torques $Tq_{RS}$ is smaller than the first threshold torque $Tq_1$, it is determined at S58 whether at least one of the stored right-wheel standard torques $Tq_{RS}$ is smaller than the second threshold torque $Tq_2$. When none of the stored right-wheel standard torques $Tq_{RS}$ are smaller than the second threshold torque $Tq_2$, the right-wheel road surface $\mu$ flag $F\mu_R$ is set to "1" at S59. That is, it is identified that the road surface on which the front right wheel 10F is passing is the first low-$\mu$ road. Whew at least one of the stored right-wheel standard torques $Tq_{RS}$ is smaller than the second threshold torque $Tq_2$, the right-wheel road surface $\mu$ flag $F\mu_R$ is set to "2" at S60. That is, it is identified that the road surface on which the front right wheel 10F is passing is the second low-$\mu$ road.

At S61, it is determined whether the left-wheel road surface $\mu$ flag $F\mu_L$ is one of "1" and "2". At S62, it is determined whether the right-wheel road surface $\mu$ flag $F\mu_R$ is one of "1" and "2". When at least one of the left-wheel road surface $\mu$ flag $F\mu_L$ and the right-wheel road surface $\mu$ flag $F\mu_R$ is "1" or "2", the warning device 86 issues a warning at S63. Both the left-wheel road surface $\mu$ flag $F\mu_L$ and the right-wheel road surface $\mu$ flag $F\mu_R$ are the control flow proceeds to S64 at which the warning from the warning device 86 is prohibited or stopped.

At S65, the left-wheel standard torques $Tq_{LS}$ and the right-wheel standard torques $Tq_{RS}$ stored in the memory are cleared. At S66, the time counter t is reset to "0", and the process according to the subroutine is ended.

In the process according to the wheel steering program executed by the computer of each steering ECU 16, information on the target steering angle $\psi^*$ of the corresponding front wheel 10F is received from the operating ECU 18 at S71. At S72, the target motor rotation angle $\theta^*$ of the steering motor 70a is determined based on the target steering angle $\psi^*$. At S73, an actual motor rotation angle $\theta$, which is an actual rotation angle of the steering motor 70a, is obtained. At S74, the motor rotation angle deviation $\Delta\theta$, which is a deviation of the actual motor rotation angle $\theta$ with respect to the target motor rotation angle $\theta^*$, is determined. At S75, the target steering torque $Tq^*$ is determined based on the motor rotation angle deviation $\Delta\theta$ according to the above expression. At S76, the target supply current $I_S^*$, which is an electric current to be supplied to the steering motor 70a, is determined based on the target steering torque $Tq^*$. At S77, the electric current based on the target supply current $I_S^*$ is supplied to the steering motor 70a.

At S78, the electric current $I_S$ being actually supplied to the steering motor 70a is detected. The control flow then proceeds to S79 to identify, based on the detected supply current $I_S$, the actual steering force, namely, the actual steering torque Tq that is being actually generated by the steering motor 70a. At S80, information on the actual steering torque Tq is transmitted to the operating ECU 18.

In the process according to the operation reaction force control program that is executed in parallel with the steering overall control program by the computer of the operating ECU 18, the steering operation angle δ is obtained at S81, the vehicle speed v is identified at S82, and the actual steering torques $Tq_L$, $Tq_R$ of the front left and right wheels 10F are received at S83. At S84, the target reaction force torque $Tq_C^*$ is determined based on the steering operation angle δ, the vehicle speed v, and the actual steering torques $Tq_L$, $Tq_R$ according to the above expression.

In a case where the vehicle is running on the low-μ road, there is executed a principal part of the notifying process for notifying the driver of the fact that the vehicle is running on the low-μ road. At S85, it is determined whether at least one of the left-wheel road surface μ flag $Fμ_L$ and the right-wheel road surface μ flag $Fμ_R$ is "1" or "2". When the left-wheel road surface μ flag $Fμ_L$ and the right-wheel road surface μ flag $Fμ_R$ are both "0", the torque reduction amount $ΔTq_C$ for reducing the reaction force torque $Tq_C$ is determined to be "0" at S86 so as not to substantially execute the notifying process. When at least one of the left-wheel road surface μ flag $Fμ_L$ and the right-wheel road surface μ flag $Fμ_R$ is "1" or "2", it is determined at S87 whether at least one of the left-wheel road surface μ flag $Fμ_L$ and the right-wheel road surface μ flag $Fμ_R$ is "2". When neither the left-wheel road surface μ flag $Fμ_L$ nor the right-wheel road surface μ flag $Fμ_R$ is "2", the torque reduction amount $ΔTq_C$ is determined to be the first torque reduction amount $ΔTq_{C1}$ at S88. When at least one the left-wheel road surface μ flag $Fμ_L$ and the right-wheel road surface μ flag $Fμ_R$ is "2", the control flow proceeds to S89 at which the torque reduction amount $ΔTq_C$ is determined to be the second torque reduction amount $ΔTq_{C2}$ larger than the first torque reduction amount $ΔTq_{C1}$.

At S90, the target reaction force torque $Tq_C^*$ is newly determined by subtracting the torque reduction amount $ΔTq_C$ determined as described above from the already determined target reaction force torque $Tq_C^*$. The control flow then proceeds to S91 to determine, based on the target reaction force torque $Tq_C^*$, the target supply current $I_C^*$ that is the electric current to be supplied to the reaction force motor 84a. At S92, the electric current bused on the target supply current $I_C^*$ is supplied to the reaction force motor 84a.

What is claimed is:

1. A steering system for a vehicle, comprising: a pair of wheel steering devices that respectively steer right and left wheels independently of each other; and a controller configured to control the pair of wheel steering devices,
   wherein the controller is configured to:
   determine a standard steering amount of each of the right and left wheels in accordance with a steering request;
   execute opposite-phase shift steering in which steering amounts of the respective right and left wheels are shifted, by respective shift amounts, in mutually opposite directions with respect to the standard steering amounts determined respectively for the right and left wheels; and
   estimate a friction coefficient of a road surface on which the vehicle is running based on steering forces respectively applied to the right and left wheels in the opposite-phase shift steering.

2. The steering system according to claim 1,
   wherein a vehicle-body slip angle at a time when the right and left wheels are steered by the respective standard steering amounts is defined as a standard vehicle-body slip angle, and
   wherein the controller is configured to execute the opposite-phase shift steering so as to maintain the vehicle-body slip angle at the standard vehicle-body slip angle.

3. The steering system according to claim 1, wherein the controller is capable of executing, in straight running of the vehicle, the opposite-phase shift steering such that the shift amount of the right wheel is equal to the shift amount of the left wheel.

4. The steering system according to claim 1, wherein the controller is capable of executing, in turning of the vehicle, the opposite-phase shift steering such that the shift amount of one of the right and left wheels located on an outer side in turning of the vehicle is smaller than the shift amount of the other of the right and left wheels located on an inner side in turning of the vehicle.

5. The steering system according to claim 1, wherein the controller is capable of executing the opposite-phase shift steering such that the shift amount of each of the right and left wheels periodically varies.

6. The steering system according to claim 5, wherein, when the shift amount of each of the right and left wheels is at its peak, the controller estimates the friction coefficient of the road surface on which the vehicle is running based on the steering forces respectively applied to the right and left wheels.

7. The steering system according to claim 1, wherein the controller is configured to estimate a degree of the friction coefficient of the road surface based on a degree of the steering force applied to each of the right and left wheels in the opposite-phase shift steering.

8. The steering system according to claim 1, wherein the controller is configured to identity that the vehicle is running on a low friction coefficient road as the estimation of the friction coefficient of the road surface on which the vehicle is running.

9. The steering system according to claim 8, wherein the controller identifies that the vehicle is running on the low friction coefficient road when the steering force of at least one of the right and left wheels in the opposite-phase shift steering is smaller than a set steering force.

10. The steering system according to claim 8, wherein the controller is configured to execute a notifying process of notifying a driver of the vehicle that the vehicle is running on the low friction coefficient road.

11. The steering system according to claim 10, further comprising: a steering operation member operated by the driver; and a reaction-force applying device configured to be controlled by the controller to apply an operation reaction force to the steering operation member,
    wherein the controller is configured to execute the notifying process such that the operation reaction force is made smaller when the vehicle is running on the low friction coefficient road than when the vehicle is not running on the low friction coefficient road.

* * * * *